(12) United States Patent
Dasar et al.

(10) Patent No.: US 10,956,170 B2
(45) Date of Patent: Mar. 23, 2021

(54) BIOS SETTING MODIFICATION SYSTEM

(71) Applicant: Dell Products L.P., Round Rock, TX (US)

(72) Inventors: Sundar Dasar, Round Rock, TX (US); Mark W. Shutt, Austin, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 16/361,424

(22) Filed: Mar. 22, 2019

(65) Prior Publication Data

US 2020/0301714 A1    Sep. 24, 2020

(51) Int. Cl.
*G06F 9/44* (2018.01)
*G06F 3/06* (2006.01)
*G06F 9/4401* (2018.01)

(52) U.S. Cl.
CPC .......... *G06F 9/4401* (2013.01); *G06F 3/0658* (2013.01)

(58) Field of Classification Search
CPC ............................ G06F 9/4401; G06F 3/0658
See application file for complete search history.

(56) References Cited

U.S. PATENT DOCUMENTS

| | | | |
|---|---|---|---|
| 6,167,511 A | 12/2000 | Lewis | |
| 6,823,516 B1 | 11/2004 | Cooper | |
| 2011/0271268 A1* | 11/2011 | Dang | G06F 9/4486 717/168 |
| 2015/0154092 A1* | 6/2015 | Chen | G06F 9/4401 713/2 |
| 2015/0169330 A1* | 6/2015 | Maity | H04L 41/0813 713/1 |
| 2016/0283221 A1* | 9/2016 | Kochar | G06F 9/45558 |

* cited by examiner

*Primary Examiner* — Stefan Stoynov
(74) *Attorney, Agent, or Firm* — Haynes and Boone, LLP

(57) ABSTRACT

A BIOS setting modification system is provided in a computing device. During a computing device runtime for the computing device, an Out-Of-Band (OOB) controller device receives a first BIOS setting modification request and, in response, generates first BIOS setting modification information and causes the transmission of a System Management Interrupt (SMI). During the computing device runtime for the computing device, an SMI handler subsystem in the computing device retrieves, in response to the SMI, the first BIOS setting modification information, either directly from the OOB controller device, or from a storage subsystem in which it was provided by the OOB controller device. The SMI handler subsystem then applies the first BIOS setting modification information to at least one subsystem in the computing device such that a first BIOS setting modification provided by the first BIOS setting modification information takes effect during the computing device runtime for the computing device.

17 Claims, 9 Drawing Sheets

BIOS SETTING MODIFICATION SYSTEM

BACKGROUND

The present disclosure relates generally to information handling systems, and more particularly to modifying BIOS settings in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, utilize a Basic Input Output System (BIOS) that may include non-volatile firmware that is configured to perform hardware initialization during a booting process for the server device, as well as provide runtime services for an operating system and/or other programs provided on the server device. The BIOS may include or be associated with a plurality of BIOS attributes/settings (hereinafter, "BIOS settings") that may be utilized to configure devices and/or other subsystems in the server device (e.g., Network Interface Controller (NIC) devices, memory devices, storage (e.g., Redundant Array of Independent Disk (RAID)) devices, the BIOS itself, etc.) to operate in a desired manner. However, the conventional BIOS provided in server devices does not provide any mechanism for modifying BIOS settings during runtime of the server device. Rather, when a user wishes to modify BIOS settings such as, for example, a memory device speed of a memory device, that user must set up an Out-Of-Band (OOB) job to modify that BIOS setting by, for example, providing BIOS settings modifications (as part of the OOB job)=to a remote access controller, Baseboard Management Controller (BMC), and/or other OOB controller device known in the art. The user must then re-boot the server device in order to have the OOB controller device provide the OOB job to the BIOS (or a pre-boot application in the server device) so that the OOB job will be executed to apply the BIOS settings modifications. Following the execution of the OOB job, the user must then re-boot the server device again in order for the BIOS setting modifications to take effect. As such, multiple re-boots of the server device are required in order to modify BIOS settings via a conventional BIOS.

Accordingly, it would be desirable to provide an improved BIOS setting modification system.

SUMMARY

According to one embodiment, an Information Handling System (IHS) includes a first processing system; and a first memory system that is coupled to the first processing system and that includes instructions that, when executed by the first processing system, cause the first processing system to provide a System Management Interrupt (SMI) handler that is configured, during an Information Handling System (IHS) runtime for an IHS, to: retrieve, in response to an SMI that was transmitted in response to an Out-Of-Band (OOB) controller receiving a Basic Input Output System (BIOS) setting modification request, first BIOS setting modification information that was generated by the OOB controller; and apply the first BIOS setting modification information to at least one subsystem in the IHS such that a first BIOS setting modification provided by the first BIOS setting modification information takes effect during the IHS runtime for the IHS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
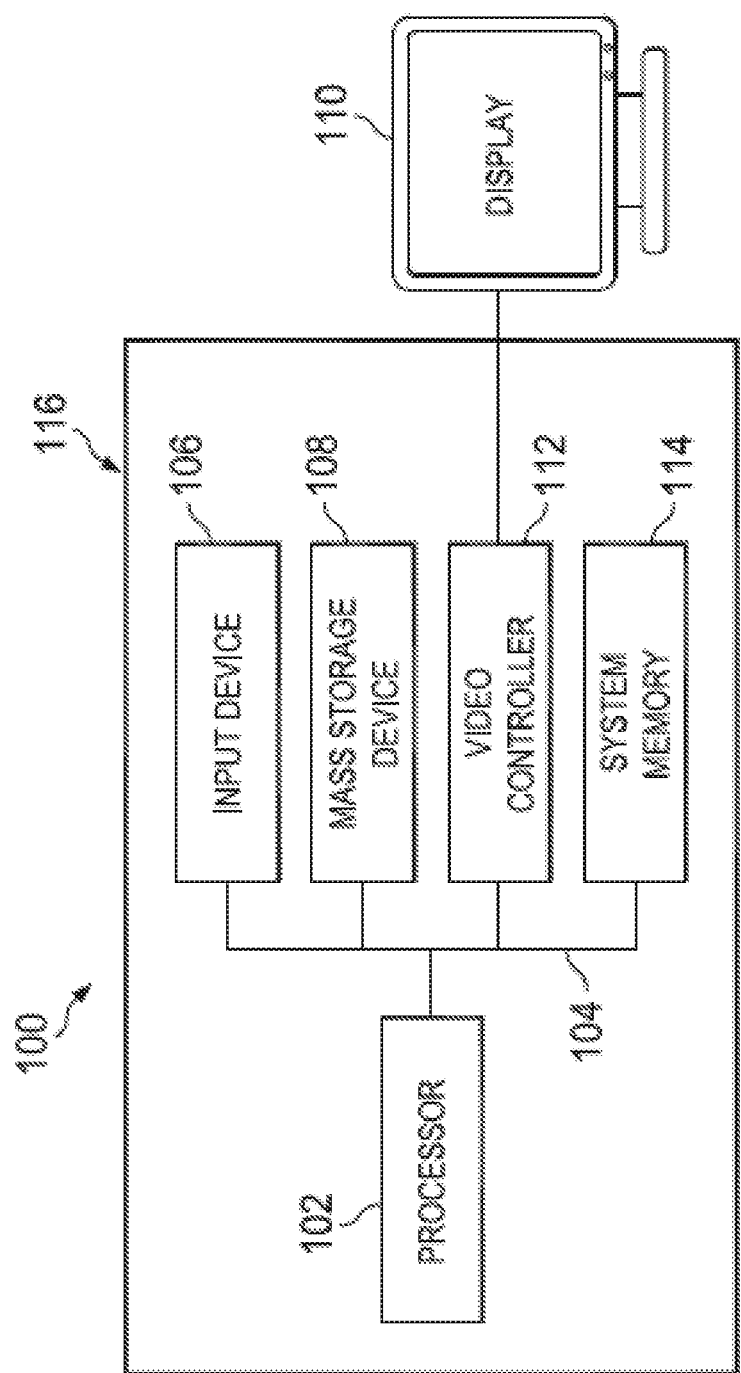
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
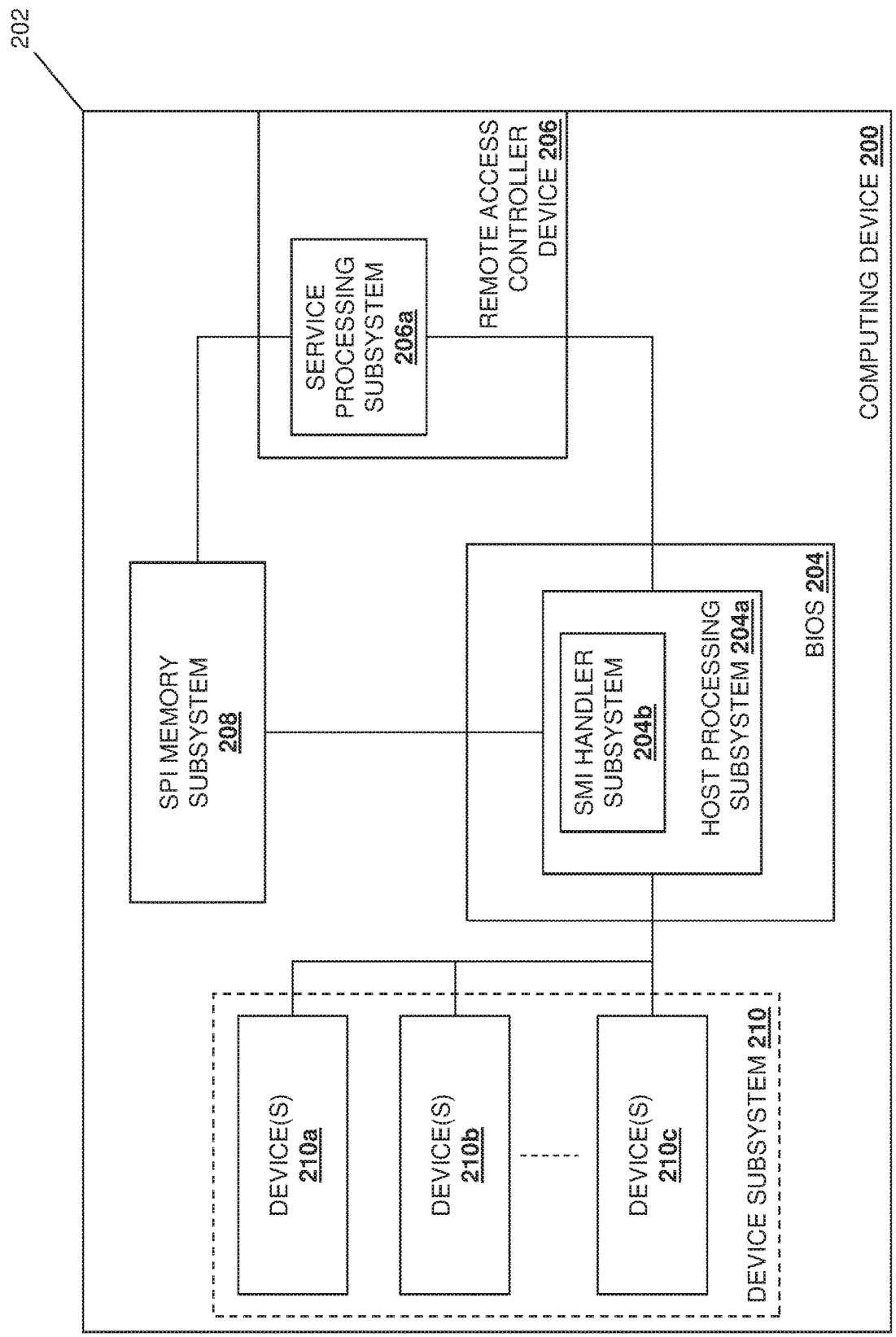
FIG. 2 is a schematic view illustrating an embodiment of a computing device including the BIOS setting modification system of the present disclosure.

Referring now to FIG. 2, an embodiment of a computing device 200 is illustrated that may provide the Basic Input Output System (BIOS) setting modification system of the present disclosure. The computing device 200 may be provided by the IHS 100 discussed above with reference to FIG. 1 and/or may include some or all of the components of the IHS 100. Furthermore, while one of skill in the art in possession of the present disclosure will recognize that the computing device 200 is illustrated and discussed below as a server device, one of skill in the art in possession of the present disclosure will recognize that the functionality of the computing device 200 discussed below may be provided by networking devices, desktop computing devices, laptop computing devices, tablet computing device, mobile phones, and/or other devices that are configured to operate similarly as discussed below. In the illustrated embodiment, the computing device 200 includes a chassis 202 that houses the components of the computing device 200, only some of which are illustrated below. For example, the chassis 202 may house a BIOS processing system (which may include the host processing subsystem 204a illustrated in FIG. 2 that may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS 204 that is configured to perform the functionality of the BIOS and/or computing devices discussed below.

One of skill in the art in possession of the present disclosure will recognize that the BIOS 204 may be provided via non-volatile firmware that is configured to perform hardware initialization during a booting process for the computing device 200, as well as provide runtime services for an operating system and/or other programs provided on the computing device 200. As would be understood by one of skill in the art in possession of the present disclosure, the BIOS may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS 204 below apply to a UEFI BIOS as well. In the illustrated embodiment, a System Management Interrupt (SMI) handler subsystem 204b is included in the BIOS 204 and provided by the host processing subsystem 204a (e.g., via instructions on the BIOS memory system that, when executed by the host processing subsystem 204a, cause the host processing subsystem 204a to provide an SMI handler engine that is configured to perform the functions of the SMI handler subsystem 204b discussed below.)

The chassis 202 may also house an Out-Of-Band (OOB) controller device that, in the illustrated embodiment, is provided by a remote access controller device 206 such as, for example, an integrated DELL® Remote Access Controller (IDRAC) available from DELL® Inc. of Round Rock, Tex., United States, other Baseboard Management Controllers (BMCs) known in the art, other server devices (e.g., web servers), and/or other OOB controller devices that would be apparent to one of skill in the art in possession of the present disclosure. While illustrated as included in the computing device 200, one of skill in the art in possession of the present disclosure will recognize that the OOB controller device/remote access controller device 206 may be located outside of the computing device 200 and coupled to that computing device 200 (e.g., located in a server rack and coupled to a server device in that server rack) while remaining within the scope of the present disclosure as well. In the illustrated embodiment, a service processing subsystem 206a operates, at least in part, to provide the remote access controller device 206, and is coupled to the host processing subsystem 204a that provides the BIOS 204.

The chassis 202 may also house a storage subsystem that, in the illustrated embodiment, is provided by a Serial Peripheral Interface (SPI) memory subsystem 208 such as, for example, an SPI flash memory device. In the illustrated embodiment, the SPI memory subsystem 208 is coupled to each of the service processing subsystem 206a that provides the remote access controller device 206, and the host processing subsystem 204a that provides the BIOS 204. The chassis 202 may also house a device subsystem 210 that is coupled to the host processing subsystem 204a that provides the BIOS 204 and that, in the illustrated embodiment, includes a plurality of devices 210a, 210b, and up to 210c. For example, the devices 210a-c in the device subsystem 210 may include memory devices (e.g., Dynamic Random Access Memory (DRAM) devices that provide a host memory subsystem), networking devices (e.g., Network Interface Controller (NIC) devices), storage devices (e.g., Redundant Array of Independent Disk (RAID) devices), and/or other devices that would be apparent to one of skill in the art in possession of the present disclosure. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
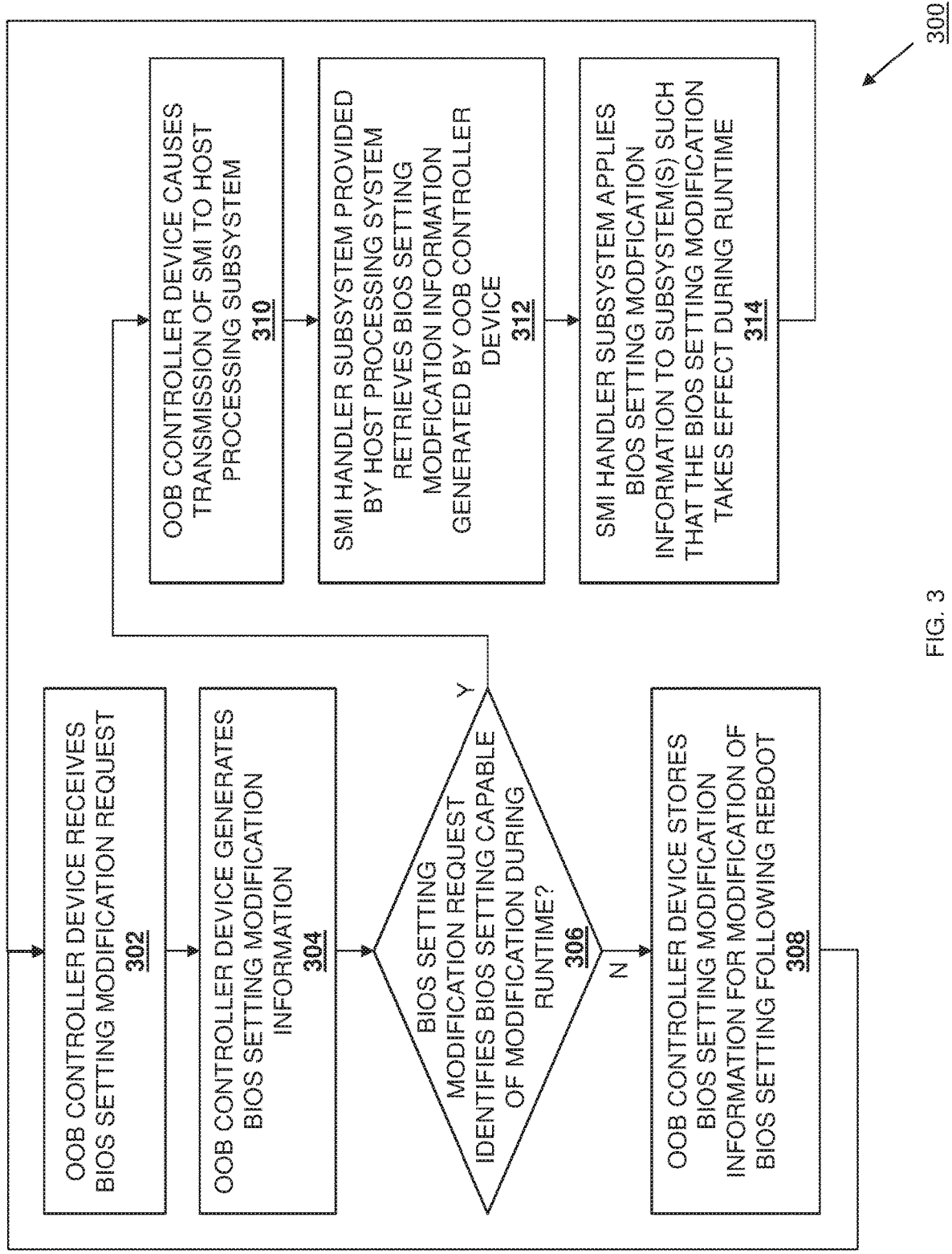
FIG. 3 is a flow chart illustrating an embodiment of a method for modifying BIOS settings.

Referring now to FIG. 3, an embodiment of a method for modifying BIOS settings is illustrated. As discussed below, the systems and methods of the present disclosure provide for the modification of BIOS settings in a computing device without requiring a reboot of that computing device. Such runtime BIOS setting modification may be enabled via an OOB controller device that receives a BIOS setting modification request from a user during a runtime of the computing device, and generates BIOS setting modification information. The OOB controller device may determines whether the BIOS setting modification request identifies a BIOS setting that is capable for being modified during runtime and, if not, the OOB controller device will store the BIOS setting modification information for later use in modifying that BIOS setting following a reboot of the computing device. However, if the OOB controller device determines that the BIOS setting modification request identifies a BIOS setting that is capable for being modified during runtime, the OOB controller device may cause a System Management Interrupt (SMI) to be transmitted to the BIOS during the runtime of the computing device. Upon receiving the SMI, an SMI handler subsystem in the BIOS may either retrieve the BIOS setting modification information directly from the OOB controller device, or may retrieve the BIOS setting modification information from a Serial Peripheral Interface (SPI) memory subsystem in which the BIOS setting modification information was provided by the OOB controller device after its generation. The SMI handler subsystem in the BIOS may then apply the BIOS setting modification information to one or more devices/subsystems in the computing device such that corresponding BIOS settings are modified in a manner that takes effect during the runtime of the computing device. As such, BIOS settings that are capable of being modified during runtime of their associated computing device may be modified without the multiple reboots of that computing device that are required by conventional BIOS setting modification systems.

Figure 4A:
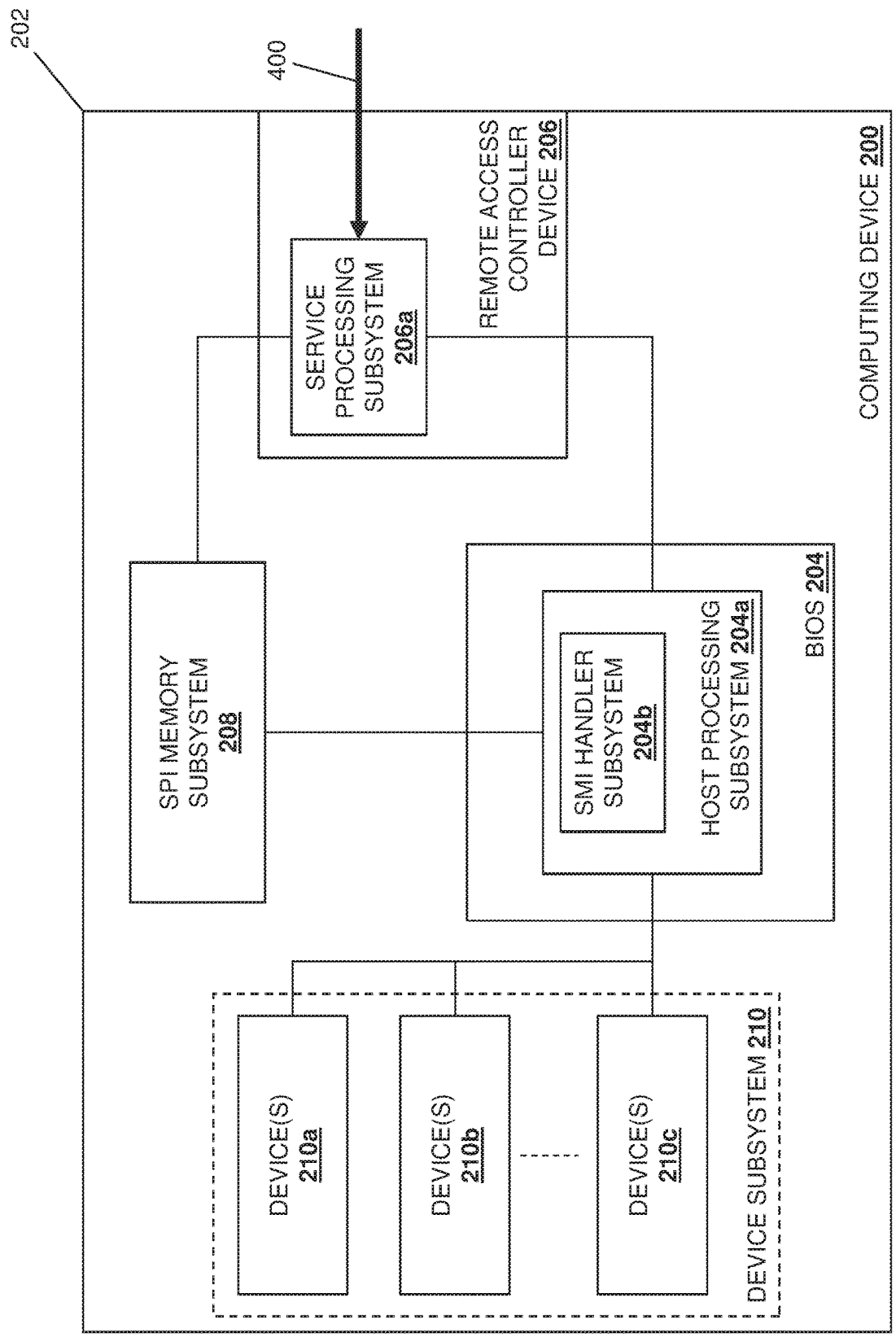
FIG. 4A is a schematic view illustrating an embodiment of the BIOS setting modification system in the computing device of FIG. 2 operating during the method of FIG. 3.

The method 300 begins at block 302 where an OOB controller device receives a BIOS setting modification request. In an embodiment, at or prior to block 302, the computing device 200 may be started up, powered on, reset, re-booted, and/or otherwise initialized, and the BIOS 204 may operate to complete that initialization process such that the computing device 200 enters a computing device runtime in which an operating system (not illustrated, but which may be provided by instructions that are included on a host memory system and that are executed by a Central Processing Unit) controls most of the operations of the computing device 200, while the BIOS 204 provides conventional BIOS runtime services for the operating system and/or other programs provided on the computing device 200 (as well as the BIOS setting modification functionality discussed below.) As illustrated in FIG. 4A, at block 302, a BIOS setting modification request 400 may be provided to the remote access controller device 206 such that the BIOS setting modification request 400 is received by the server processing subsystem 206a during a computing device runtime for the computing device 200. As would be understood by one of skill in the art in possession of the present disclosure, OOB controller devices such as the remote access controller device 206 may communicate with devices outside of the computing device 200 via OOB channels and/or OOB interfaces.

In a specific example, a network administrator or other user of the computing device 200 may use a management device (e.g., a desktop computing device, a laptop notebook computing device, a tablet computing device, a mobile phone, etc.) to establish an OOB connection with the remote access controller device 206 via an OOB channel (e.g., provided by a management network) coupled to an OOB interface (e.g., a NIC device (not illustrated) in the remote access controller device 206 that is separate from a NIC device (not illustrated) utilized by a CPU (not illustrated) in the computing device 200 to communicate during the computing device runtime) in the remote access controller device 206. However, while a specific example, of the remote access controller device 206 receiving an OOB BIOS setting modification request via an OOB channel and through an OOB interface has been described, one of skill in the art in possession of the present disclosure will recognize that the service processing subsystem 206a and/or the remote access controller device 206 may receive the BIOS setting modification request 400 of the present disclosure in a variety of manners and via a variety of techniques that will fall within its scope.

The method 300 then proceeds to block 304 where the OOB controller device generates BIOS setting modification information. In an embodiment, at block 304 and using the BIOS setting modification request 400 received at block 302, the service processing subsystem 206a in the remote access controller device 206 may operate to generate BIOS setting modification information during the computing runtime of the computing device 200. As would be understood by one of skill in the art in possession of the present disclosure, the BIOS setting modification request 400 received by the remote access controller device 206 may include a variety of data identifying a BIOS setting, a requested modification to that BIOS setting, and/or other BIOS setting modification request data known in the art. As such, at block 304, the service processing system 206a in the remote access controller device 206 may use the BIOS setting modification request data in the BIOS setting modification request 400 to generate BIOS setting modification information that is configured to provide for a requested modification to the BIOS setting identified in the BIOS setting modification request 400. In a specific example, the BIOS setting modification information may be generated by the service processing system 206a in the remote access controller subsystem 206a at block 304 by processing the BIOS setting modification request data and, in response, forming a route configuration string that is configured to be applied to one or more subsystems in the computing device 200 in order to modify a BIOS setting for that subsystem. While discussed as being performed immediately following the receiving of the BIOS setting modification request at block 302, one of skill in the art in possession of the present disclosure will recognize that the generation of the BIOS setting modification information using the BIOS setting modification request at block 304 may be performed following other blocks of the method 300 while remaining within the scope of the present disclosure as well.

The method 300 then proceeds to decision block 306 where the OOB controller device determines whether the BIOS setting modification request identifies a BIOS setting that is capable of modification during runtime. In an embodiment, at decision block 306, the service processing subsystem 206a in the remote access controller device 206 may operate to determine whether the BIOS setting identified in the BIOS setting modification request received at block 302 is a BIOS setting that is capable of modification during the computing device runtime of the computing device 200 such that any modification of that BIOS setting may take effect during the computing device runtime of the computing device 200 without requiring a reboot of the computing device 200. As would be understood by one of skill in the art in possession of the present disclosure, the BIOS 204 may include a variety of BIOS settings such as, for example, a memory speed of a memory subsystem, setting passwords, and/or other BIOS settings known in the art, that are capable of being modified during the computing device runtime of the computing device 200 without requiring a reboot of the computing device 200, while also including BIOS settings such as, for example, boot mode, boot sequence, Redundant Array of Independent Disks (RAID) mode, which each require reboot(s) of the computing device 200 in order to take effect. As discussed below, the BIOS setting modification system of the present disclosure operates to recognize when the BIOS setting modification request 400 requests the modification of a BIOS setting that is capable of being modified during the computing device runtime of the computing device 200 without requiring a reboot of the computing device 200 and, rather than performing multiple reboots of the computing device 200 in order to apply that modification and have it take effect, operates to apply that modification and have it take effect during the same computing device runtime of the computing device 200 in which that BIOS setting modification request 400 was received.

If, at decision block 306, it is determined that the BIOS setting modification request identifies a BIOS setting that is not capable of modification during runtime, the method 300 proceeds to block 308 where the OOB controller device stores the BIOS setting modification information for modification of the BIOS setting following a reboot of the computing device. In an embodiment, at block 308, the service processing subsystem 206*a* in the remote access controller device 206 may have determined that the BIOS setting modification request received at block 302 identifies a BIOS setting that is not capable of being modified during the computing device runtime of the computing device 200 without requiring a reboot of the computing device 200 and, in response, operates to store the BIOS setting modification information generated at block 304 in a database so that that BIOS setting modification information may be utilized to modify the corresponding BIOS setting following reboot of the computing device 200. For example, at block 308, the service processing subsystem 206*a* in the remote access controller device 206 may store the BIOS setting modification information in a configuration database (not illustrated) that is shared between the service processing subsystem 206*a* and the host processing subsystem 204*a*.

Thus, for BIOS settings that are not capable of being modified during the computing device runtime of the computing device 200 without requiring a reboot of the computing device 200, the BIOS setting modification system of the present disclosure may operate in the conventional manner discussed above by, for example, storing the BIOS setting modification information as an Out-Of-Band (OOB) job, requiring a user to re-boot the computing device 200 (e.g., during a scheduled maintenance window for the computing device 200) in order to have the remote access controller device 206 provide the OOB job to the BIOS 204 (or a pre-boot application in the computing device 200) so that the OOB job will be executed, and then requiring the user to re-boot the computing device 200 again in order for the BIOS setting modification to take effect. While discussed above as before performed prior to determining that the BIOS setting identified in the BIOS setting modification request is not capable of being modified during the computing device runtime of the computing device 200 without requiring a reboot of the computing device 200, the generation of the BIOS setting modification information may be performed after that determination while remaining within the scope of the present disclosure as well. Following block 308, the method returns to block 302. As such, the method 300 may loop through blocks 302, 304, 306, and 308 to receive BIOS setting modification requests, generate BIOS setting modification information, and store that BIOS setting modification information for use in modifying corresponding BIOS settings following a reboot of the computing device 200 when those BIOS settings are not capable of modification during the computing device runtime of the computing device 200.

Figure 4B:
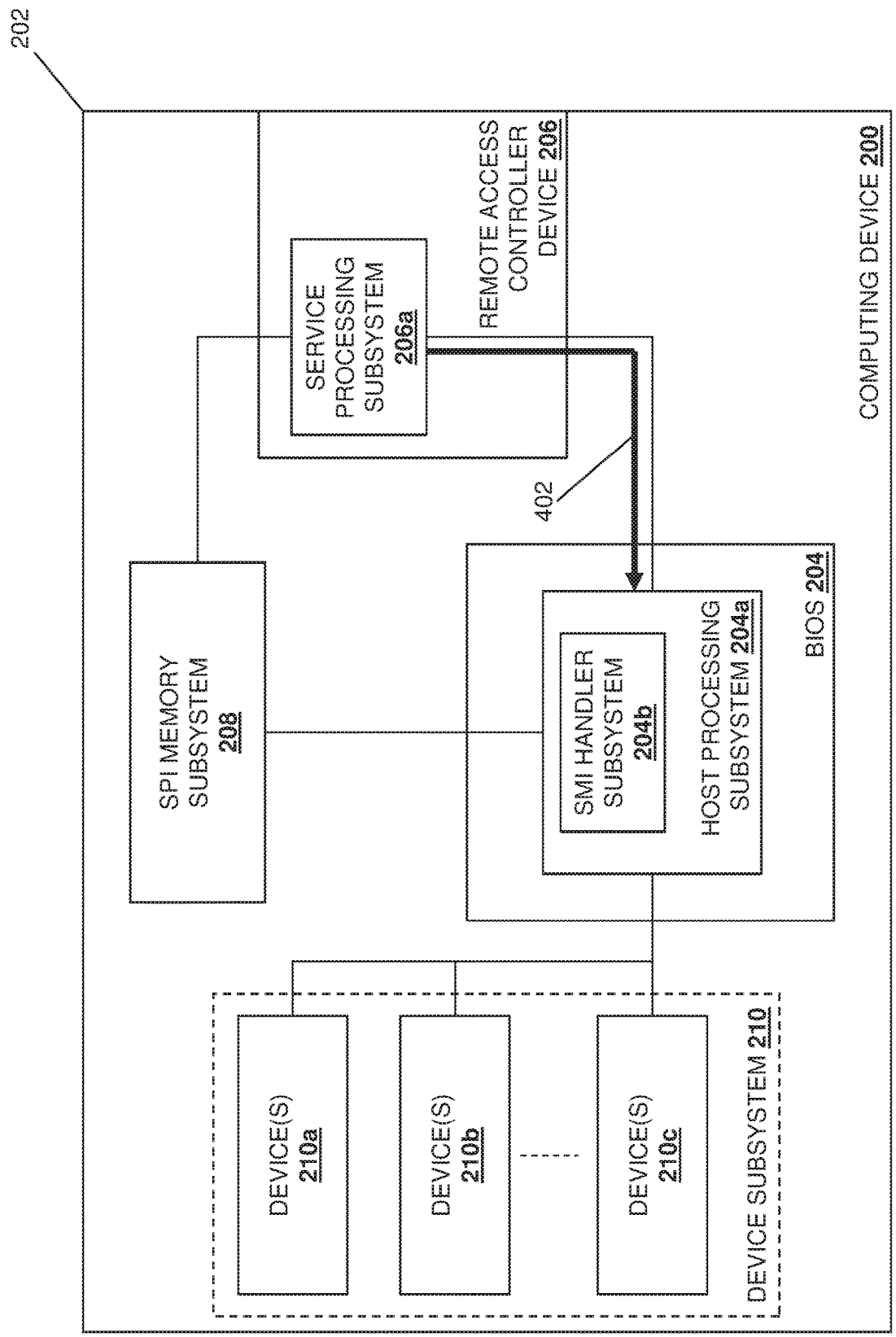
FIG. 4B is a schematic view illustrating an embodiment of the BIOS setting modification system in the computing device of FIG. 2 operating during the method of FIG. 3.

If at decision block 306, it is determined that the BIOS setting modification request identifies a BIOS setting that is capable of modification during runtime, the method 300 proceeds to block 310 where the OOB controller device causes the transmission of an SMI to a host processing subsystem. As illustrated in FIG. 4B, in an embodiment of block 310, the service processing subsystem 206*a* in the remote access controller device 206 may have determined that the BIOS setting modification request received at block 302 identifies a BIOS setting that is capable of being modified during the computing device runtime of the computing device 200 without requiring a reboot of the computing device 200 and, in response, causes a System Management Interrupt (SMI) 402 to be transmitted to the host processing subsystem 204 that provides the BIOS 204. As would be understood by one of skill in the art in possession of the present disclosure, an SMI may enable access to a System Management Mode (SMM) provided by of the host processing system 204, and may result in the SMI handler subsystem 204*b* provided by the host processing subsystem 204 executing SMM code to perform the BIOS setting modification functionality discussed below. However, the BIOS setting modification functionality may be provided using other techniques that will fall within the scope of the present disclosure as well. While the service processing subsystem 206*a* in the remote access controller device 206 is illustrated as transmitting the SMI 402 to the host processing subsystem 204*a*, in other embodiments the service processing subsystem 206*a* in the remote access controller device 206 may operate to instruct or otherwise cause another subsystem in the computing device 200 to transmit the SMI to the host processing subsystem 204*a* while remaining within the scope of the present disclosure as well.

Figure 4C:
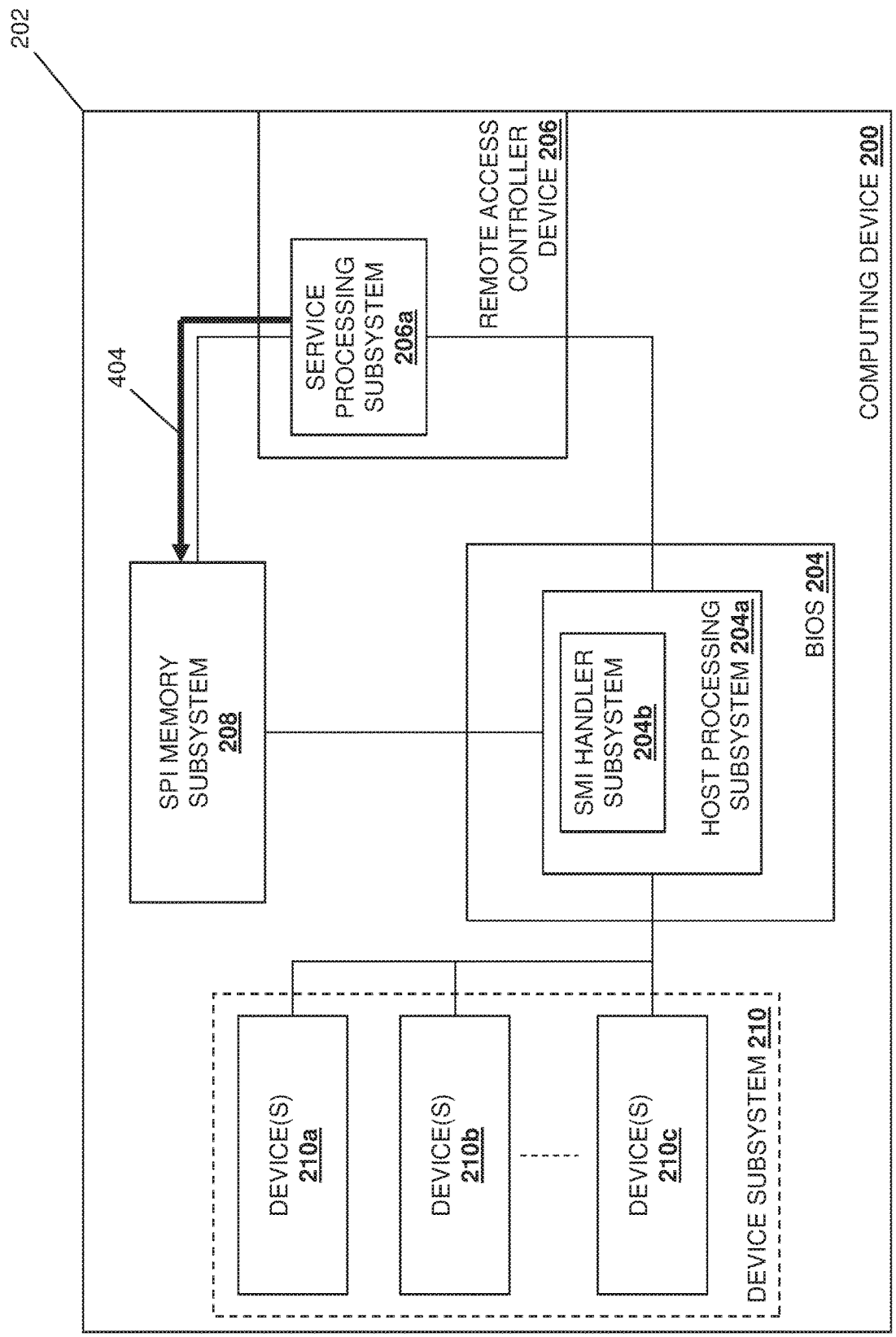
FIG. 4C is a schematic view illustrating an embodiment of the BIOS setting modification system in the computing device of FIG. 2 operating during the method of FIG. 3.
Figure 4D:
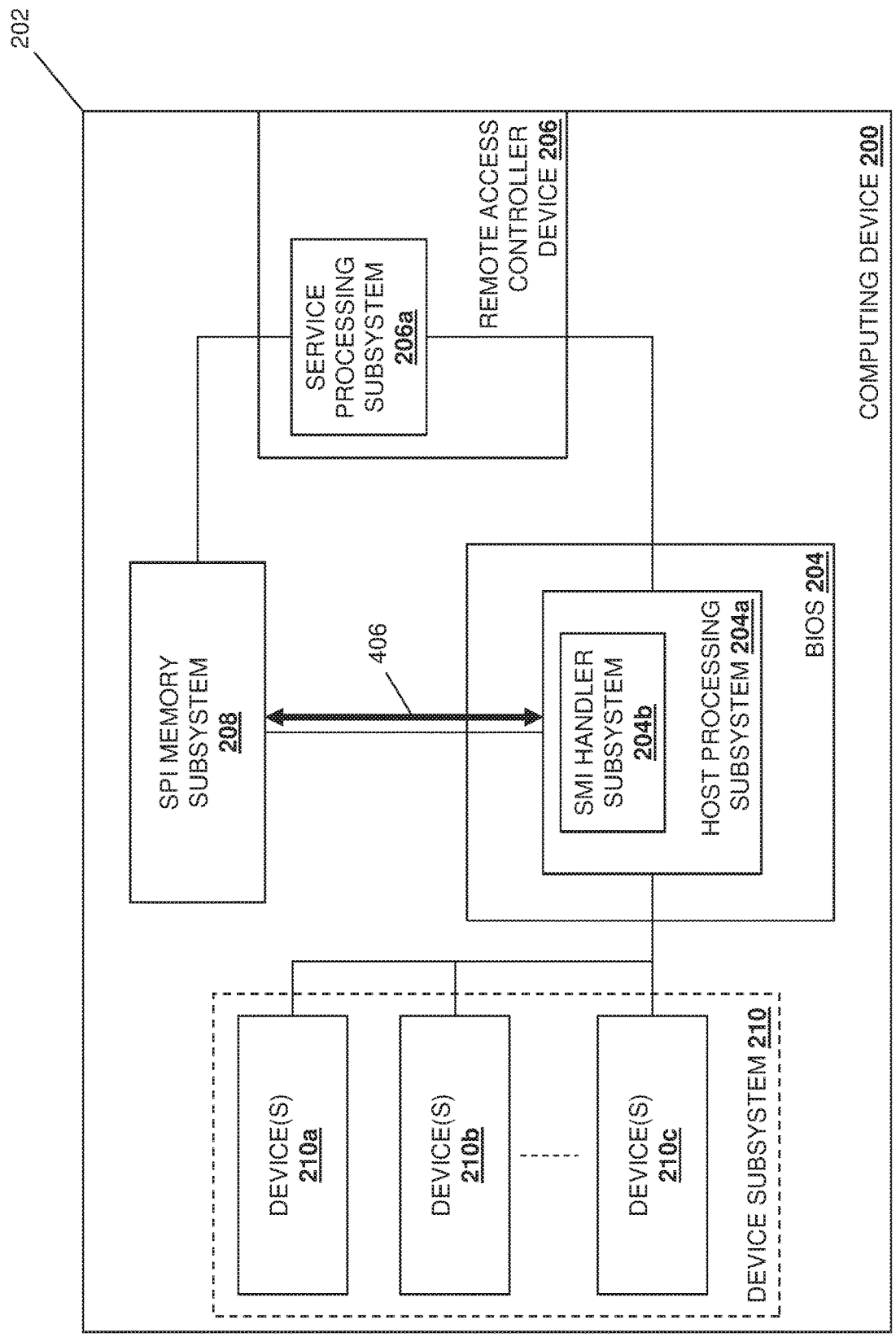
FIG. 4D is a schematic view illustrating an embodiment of the BIOS setting modification system in the computing device of FIG. 2 operating during the method of FIG. 3.
Figure 4E:
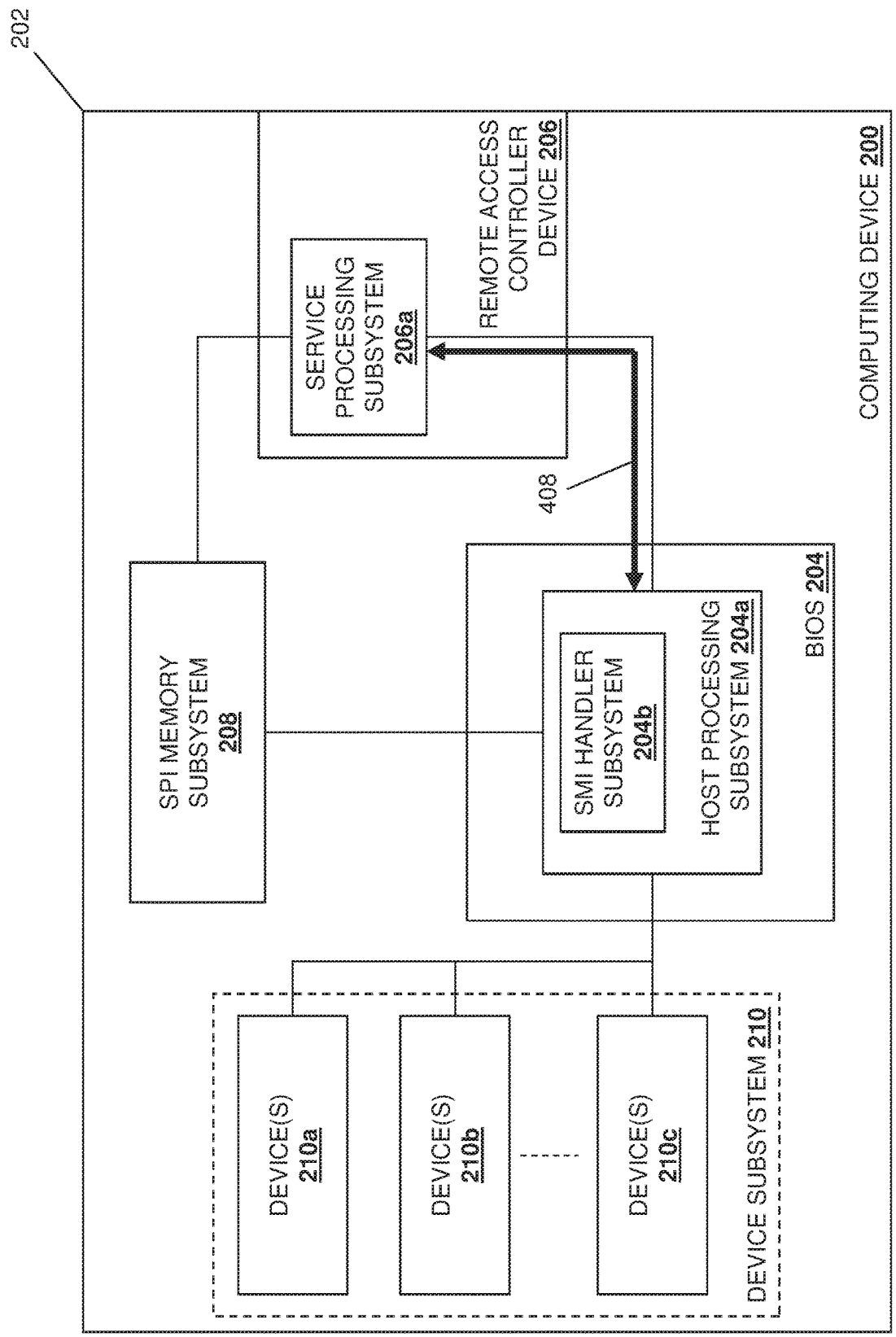
FIG. 4E is a schematic view illustrating an embodiment of the BIOS setting modification system in the computing device of FIG. 2 operating during the method of FIG. 3.

The method 300 then proceeds to block 312 where an SMI handler subsystem retrieves the BIOS setting modification information that was generated by the OOB controller device. In an embodiment, at block 312 and in response to receiving the SMI at block 310, an SMI handler subsystem 204*b* that is provided by the host processing system 204 and that is configured to handle the SMI transmitted at block 310 operates to retrieve the BIOS setting modification information that was generated by the remote access controller device 206 at block 304. As such, the SMI handler subsystem 204*b* illustrated in FIG. 2 may be one of a plurality of SMI handler subsystems provided by the host processing subsystem 204*a*, and may be selected and utilized at block 312 to handle the SMI transmitted at block 310 in order to retrieve the BIOS setting modification information that was generated by the remote access controller device 206 at block 304. With reference to FIG. 4C, in some embodiments, at or following the generation of the BIOS setting modification information at block 304, the service processing subsystem 206a in the remote access controller device 206 may operate to store BIOS setting modification information 404 generated from the BIOS setting modification request received at block 302 in the SPI memory subsystem 208. As such, as illustrated in FIG. 4D, at block 312 the SMI handler subsystem 204b provided by the host processing system 204 may perform retrieval operations 406 to retrieve the BIOS setting modification information from the SPI memory subsystem 208. However, in other embodiments, as illustrated in FIG. 4E, at block 312 the SMI handler subsystem 204b provided by the host processing system 204 may perform retrieval operations 408 to retrieve the BIOS setting modification information generated by the service processing subsystem 206a in the remote access controller device 206 at block 304 directly from the service processing subsystem 206a in the remote access controller device 206. For example, at block 312 the SMI handler subsystem 204b provided by the host processing system 204 may utilize an Intelligent Platform Management Interface (IPMI) with the service processing subsystem 206a in the remote access controller device 206 in order to retrieve the BIOS setting modification information directly at block 312.

Figure 4F:
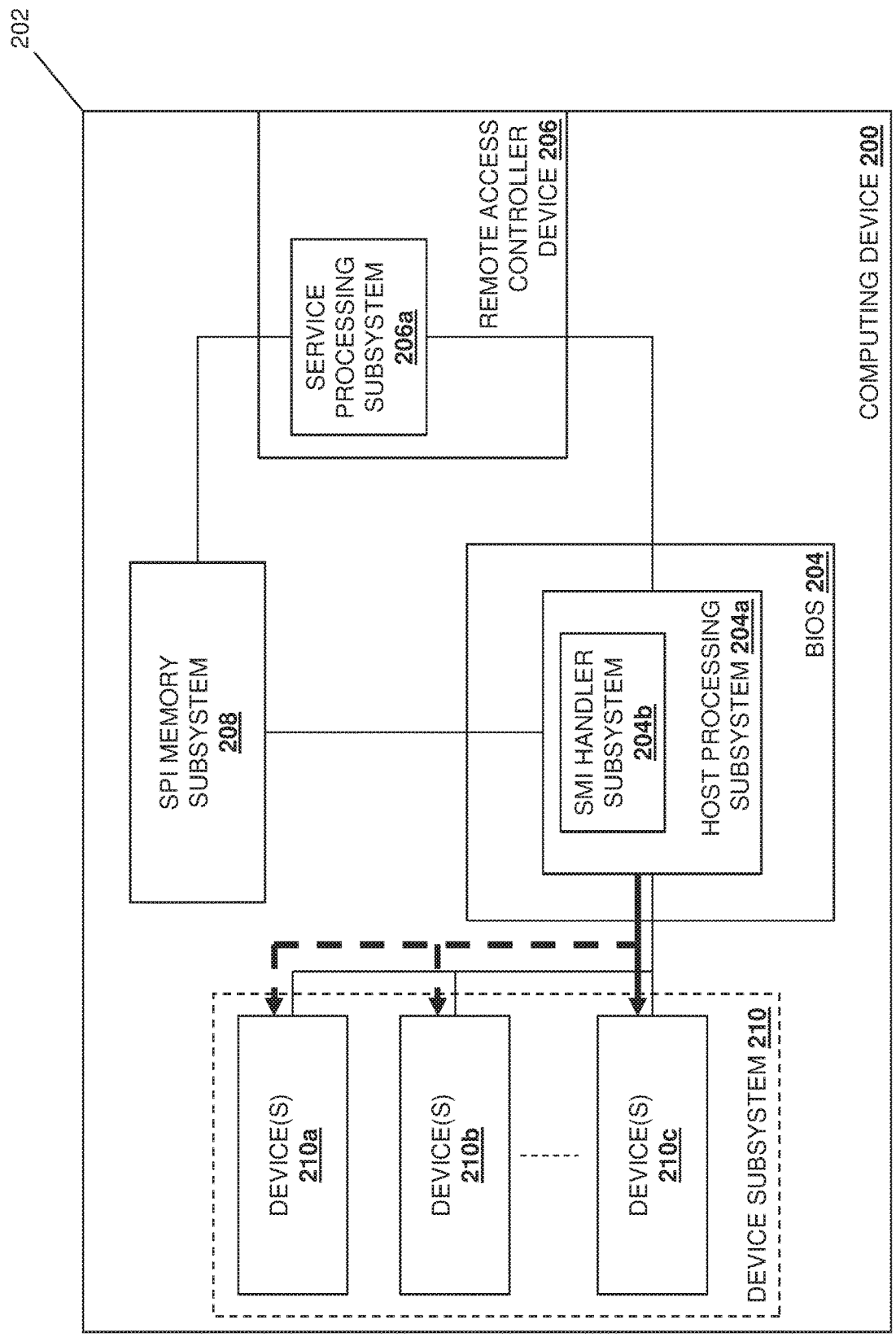
FIG. 4F is a schematic view illustrating an embodiment of the BIOS setting modification system in the computing device of FIG. 2 operating during the method of FIG. 3.

The method 300 then proceeds to block 314 where the SMI handler subsystem applies the BIOS setting modification information to subsystem(s) such that the BIOS setting modification takes effect during runtime. In an embodiment, at block 314, the SMI handler subsystem 204b provided by the host processing system 204 may operate to apply the BIOS setting modification information retrieved at block 312 to one or more subsystems in the computing device 200 such that the associated modification(s) to BIOS setting(s) take effect during the computing device runtime of the computing device 200 and without requiring a reboot of the computing device 200. With reference to FIG. 4F, the SMI handler subsystem 204b provided by the host processing system 204 is illustrated as applying the BIOS setting modification information to one or more of the devices 210a-210c in the device subsystem 210 such that the associated modification(s) to BIOS setting(s) take effect during the computing device runtime of the computing device 200 and without requiring a reboot of the computing device 200. In specific example, the BIOS setting modifications may include modifications to a memory settings (e.g., memory speed) for memory subsystems/devices, modifications to NIC settings for NIC subsystems/devices, modifications to storage settings (e.g., RAID settings) to storage subsystems/devices, and/or other modifications to other BIOS settings that would be apparent to one of skill in the art in possession of the present disclosure. Following block 314, the method returns to block 302. As such, the method 300 may loop through blocks 302, 304, 306, 310, 312, and 314 to receive BIOS setting modification requests during a computing device runtime, generate BIOS setting modification information during that computing device runtime, and cause the transmission of an SMI during that computing device runtime that results in the retrieval of the BIOS setting modification information and its application to subsystem(s) that take effect during that computing device runtime when that BIOS setting is capable of modification during runtime. Thus, following the initialization of the computing device 200 such that the computing device 200 enters a computing device runtime, requests to modify BIOS settings may be received during that computing device runtime and without any reboots of the computing device 200, and modifications to BIOS settings may be applied and may take effect during that computing device runtime and without any reboots of the computing device 200.

Thus, systems and methods have been described that provide for the modification of BIOS settings during a server device runtime and without requiring a reboot of that server device. Such runtime BIOS setting modification may be enabled via a remote access controller device that receives a BIOS setting modification request via an OOB interface during the server device runtime, and generates associated BIOS setting modification information. If the remote access controller device determines that the BIOS setting modification request identifies a BIOS setting that is capable for being modified during the server device runtime, the remote access controller device may cause a System Management Interrupt (SMI) to be transmitted to the BIOS during the server device runtime Upon receiving the SMI, an SMI handler subsystem in the BIOS may either retrieve the BIOS setting modification information directly from the remote access controller device, or may retrieve the BIOS setting modification information from a Serial Peripheral Interface (SPI) memory subsystem in which the BIOS setting modification information was stored by the remote access controller device after it was generated. The SMI handler subsystem in the BIOS may then apply the BIOS setting modification information to one or more devices/subsystems in the server device such that corresponding BIOS settings are modified in a manner that takes effect during the server device runtime. As such, BIOS settings that are capable of being modified during the server device runtime of their associated server device may be modified without the need for any reboots of that server device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input Output System (BIOS) setting modification system, comprising:
   a computing device;
   an Out-Of-Band (OOB) controller device is configured, during a computing device runtime for the computing device, to:
   receive a first BIOS setting modification request that identifies a first BIOS setting that is capable of being modified during the computing device runtime for the computing device, wherein the first BIOS setting that is capable of being modified during the computing device runtime for the computing device includes at least one of a memory setting for a memory subsystem, a Network Interface Controller (NIC) setting for a NIC subsystem, a storage setting for a storage subsystem, or a password setting that sets a password;
   generate, in response to receiving the first BIOS setting modification request, first BIOS setting modification information; and
   cause, in response to receiving the first BIOS setting modification request that identifies the first BIOS setting that is capable of being modified during the computing device runtime for the computing device, transmission of a System Management Interrupt (SMI); and
   an SMI handler subsystem that is included in the computing device, coupled to the OOB controller device, and configured, during the computing device runtime for the computing device, to:
  retrieve, in response to the SMI, the first BIOS setting modification information; and
  apply the first BIOS setting modification information to at least one subsystem in the computing device such that a first BIOS setting modification provided by the first BIOS setting modification information takes effect during the computing device runtime for the computing device.

2. The system of claim 1, wherein the SMI handler subsystem is configured to:
  retrieve the first BIOS setting modification information directly from the OOB controller device.

3. The system of claim 1, further comprising:
  a storage subsystem that is coupled to the OOB controller device and the SMI handler subsystem, wherein the OOB controller device is configured to:
    provide the first BIOS setting modification information in the storage subsystem, and wherein the SMI handler subsystem is configured to:
      retrieve the first BIOS setting modification information from the storage subsystem.

4. The system of claim 1, wherein the first BIOS setting modification information is provided by a route configuration string.

5. The system of claim 1, wherein the OOB controller device is configured to:
  receive a second BIOS setting modification request;
  generate, in response to receiving the second BIOS setting modification request, second BIOS setting modification information;
  determine that the second BIOS setting modification request identifies a second BIOS setting that is not capable of being modified during the computing device runtime for the computing device;
  store, in response to determining that the second BIOS setting modification request identifies the second BIOS setting that is not capable of being modified during the computing device runtime for the computing device, the second BIOS setting modification request; and
  provide, following a reboot of the computing device, the second BIOS setting modification request for modifying the second BIOS setting.

6. An Information Handling System (IHS), comprising:
  a first processing system;
  a first memory system that is coupled to the first processing system and that includes instructions that, when executed by the first processing system, cause the first processing system to provide an Out-Of-Band (OOB) controller that is configured, during an IHS runtime for the IHS, to:
    receive a first Basic Input Output System (BIOS) setting modification request that identifies a first BIOS setting that is capable of being modified during the IHS runtime for the IHS, wherein the first BIOS setting that is capable of being modified during the IHS runtime for the IHS includes at least one of a memory setting for a memory subsystem, a Network Interface Controller (NIC) setting for a NIC system, a storage setting for a storage system, or a password setting that sets a password;
    generate, in response to receiving the first BIOS setting modification request, first BIOS setting modification information; and
    cause, in response to receiving the first BIOS setting modification request that identifies the first BIOS setting that is capable of being modified during the IHS runtime for the IHS, transmission of a System Management Interrupt (SMI);
  a second processing system; and
  a second memory system that is coupled to the second processing system and that includes instructions that, when executed by the second processing system, cause the second processing system to provide an SMI handler that is configured, during the IHS runtime for the IHS, to:
    retrieve, in response to the SMI, the first BIOS setting modification information that was generated by the OOB controller; and
    apply the first BIOS setting modification information to at least one subsystem in the IHS such that a first BIOS setting modification provided by the first BIOS setting modification information takes effect during the IHS runtime for the IHS.

7. The IHS of claim 6, wherein the SMI handler is configured to:
  retrieve the first BIOS setting modification information directly from the OOB controller.

8. The IHS of claim 6, wherein the SMI handler is configured to:
  retrieve the first BIOS setting modification information from a storage subsystem, wherein the first BIOS setting modification information was provided in the storage subsystem by the OOB controller.

9. The IHS of claim 8, wherein the storage subsystem is provided by a Serial Peripheral Interface (SPI) memory subsystem.

10. The IHS of claim 6, wherein the first BIOS setting modification information is provided by a route configuration string.

11. The IHS of claim 6, wherein the OOB controller is configured, during the IHS runtime for the IHS, to:
  receive a second BIOS setting modification request;
  generate, in response to receiving the second BIOS setting modification request, second BIOS setting modification information;
  determine that the second BIOS setting modification request identifies a second BIOS setting that is not capable of being modified during the IHS runtime for the IHS;
  store, in response to determining that the second BIOS setting modification request identifies the second BIOS setting that is not capable of being modified during the IHS runtime for the IHS, the second BIOS setting modification request; and
  provide, following a reboot of the IHS, the second BIOS setting modification request for modifying the second BIOS setting.

12. A method for modifying Basic Input Output System (BIOS) settings during a computing device runtime for a computing device, comprising:
  receiving, by an Out-Of-Band (OOB) controller device during the computing device runtime, a first Basic Input Output System (BIOS) setting modification request that identifies a first BIOS setting that is capable of being modified during the computing device runtime, wherein the first BIOS setting that is capable of being modified during the computing device runtime includes at least one of a memory setting for a memory subsystem, a Network Interface Controller (NIC) setting for a NIC subsystem, a storage setting for a storage subsystem, or a password setting that sets a password;

generating, by the OOB controller device during the computing device runtime and in response to receiving the first BIOS setting modification request, first BIOS setting modification information;

causing, by the OOB controller device during the computing device runtime and in response to receiving the first BIOS setting modification request that identifies the first BIOS setting that is capable of being modified during the computing device runtime, transmission of a System Management Interrupt (SMI);

retrieving, by an SMI hander subsystem during the computing device runtime and in response to the SMI, the first BIOS setting modification information that was generated by the OOB controller device; and applying, by the SMI handler subsystem during the computing device runtime, the first BIOS setting modification information to at least one subsystem in the computing device such that a first BIOS setting modification provided by the first BIOS setting modification information takes effect during the computing device runtime.

13. The method of claim 12, further comprising:
retrieving, by the SMI handler subsystem, the first BIOS setting modification information directly from the OOB controller device.

14. The method of claim 12, further comprising:
retrieving, by the SMI handler subsystem, the first BIOS setting modification information from a storage subsystem, wherein the first BIOS setting modification information was provided in the storage subsystem by the OOB controller device.

15. The method of claim 14, wherein the storage subsystem is provided by a Serial Peripheral Interface (SPI) memory subsystem.

16. The method of claim 12, wherein the first BIOS setting modification information is provided by a route configuration string.

17. The method of claim 12, further comprising:
receiving, by the OOB controller device during the computing device runtime, a second BIOS setting modification request;

generating, by the OOB controller device during the computing device runtime and in response to receiving the second BIOS setting modification request, second BIOS setting modification information;

determining, by the OOB controller device during the computing device runtime, that the second BIOS setting modification request identifies a second BIOS setting that is not capable of being modified during the computing device runtime;

storing, by the OOB controller device during the computing device runtime and in response to determining that the second BIOS setting modification request identifies the second BIOS setting that is not capable of being modified during the computing device runtime, the second BIOS setting modification request; and providing, by the OOB controller device following a reboot of the computing device, the second BIOS setting modification request for modifying the second BIOS setting.

* * * * *